United States Patent [19]
Yoshino

[11] Patent Number: 5,420,617
[45] Date of Patent: May 30, 1995

[54] IMAGE FORMING APPARATUS PROVIDED WITH A LASER-BEAM-WRITING MEANS

[75] Inventor: Kunihisa Yoshino, Hachioji, Japan

[73] Assignee: Konica Corporation, Japan

[21] Appl. No.: 1,167

[22] Filed: Jan. 7, 1993

[30] Foreign Application Priority Data

Jan. 23, 1992 [JP]  Japan .................................. 4-010265

[51] Int. Cl.$^6$ ............................................. B41J 2/435
[52] U.S. Cl. .................................................... 342/140
[58] Field of Search ...................... 346/1.1, 76 L, 108, 346/107 R, 160, 153.1; 355/200, 202

[56] References Cited
U.S. PATENT DOCUMENTS

| | | | |
|---|---|---|---|
| 4,914,455 | 4/1990 | Hayes | 346/160 |
| 5,025,272 | 6/1991 | Haneda et al. | 346/153.1 |
| 5,115,259 | 5/1992 | Itoh | 346/160 |
| 5,189,441 | 2/1993 | Fukui et al. | 346/160 |

*Primary Examiner*—Mark J. Reinhart
*Attorney, Agent, or Firm*—Jordan B. Bierman; Bierman and Muserlian

[57] ABSTRACT

An apparatus for forming a latent image on a photoreceptor with a laser beam and for developing the latent image with a developer. A duty ratio of the laser beam is changed in accordance with the laps of using time of the developer.

4 Claims, 5 Drawing Sheets

FIG. 1
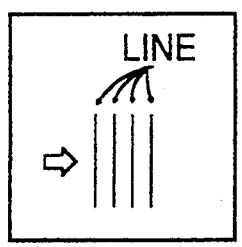
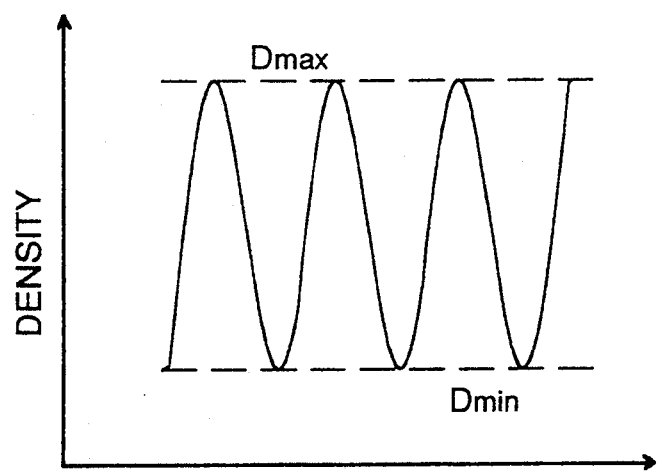
$$\text{MTF} = \frac{\text{Dmax} - \text{Dmin}}{\text{Dmax} + \text{Dmin}} \times 100$$
FIG. 2(a)   FIG. 2(b)   FIG. 2(c)
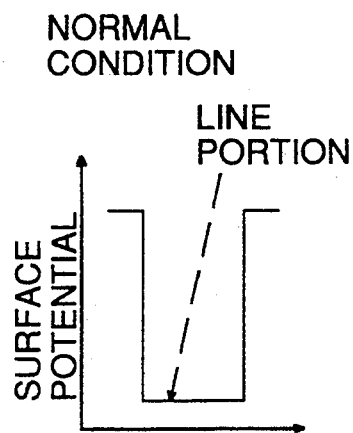
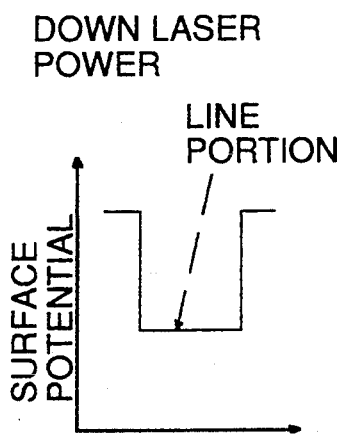
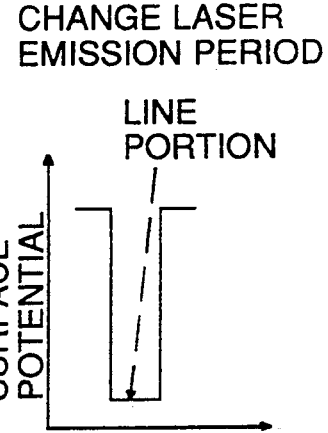

FIG. 7

| DC'(I) \ DC(I) | PLUS | 0 | MINUS |
|---|---|---|---|
| PLUS | -20% | -10% | -5% |
| 0 | +5% | 0 | +5% |
| MINUS | +5% | +10% | +20% |

IMAGE FORMING APPARATUS PROVIDED WITH A LASER-BEAM-WRITING MEANS

BACKGROUND OF THE INVENTION

The present invention relates to an image forming apparatus for forming an electrostatic latent image on an image carrier by the use of a laser beam and developing the latent image with toners, wherein the sharpness on a line image portion can be improved without sacrificing image density on a solid image portion when writing a latent image through exposure by means of a laser beam and thereby both preferable image density and sharpness are achieved.

As a measure for controlling initial excessive developability (rate of toner adhesion on the surface of a photoreceptor for developers to be supplied) that takes place when fresh developers are used, following measures are generally taken.

(1) To control power of a laser
(2) To lower initial toner concentration in the developer ... 2-component development
(3) To lower charging voltage In the invention, an MTF (analytical value for evaluating sharpness) for generated images can be improved. According to a definition of MTF shown in FIG. 1, the MTF is determined by a ratio of the difference between the maximum density (line image portion) and the minimum density (sheet portion) to the sum thereof, both the maximum and minimum densities being obtained when image density on a resolution chart on which a plurality of lines are arranged at constant intervals, for example, is measured in the direction (for example, arrowed direction in the figure) perpendicular to the lines on the resolution chart.

For the purpose of improving the MTF deteriorated by thickened line widths caused by the use of fresh developers, it is necessary to lower the developability on the line image portion. As a method therefor, the three methods mentioned above have so far been used. However, the methods (1)–(3) prove to be excessive measures resulting in deterioration of the developability for entire portions (both line images portion and solid images portion) exceeding the line images portion, though they have been planned to aim an improvement of the MTF on the line images portion. Therefore, the maximum image density of the solid images portion is sacrificed. Further, in all of the (1)–(3) methods, a development electric field tends to be small, which does not lead to an improvement of the MTF because a span (difference between the upper limit value and the lower limit value in the measurement range) between the maximum density and the minimum density in output images is narrowed down if the development electric field is made small.

An aim of the present method is to improve the MTF by changing the emission time of a laser beam for one pixel without changing charging voltage, toner concentration and laser power from their initial values set.

SUMMARY OF THE INVENTION

The above-mentioned object can be achieved by an image forming apparatus comprising a laser-beam-writing means wherein the emission time for a laser beam per one pixel can be changed depending on the number of prints made or on density of images visualized.

BRIEF DESCRIPTION OF THE DRAWINGS

FIG. 1 is a diagram showing a definition of an MTF, FIGS. 2(a), 2(b) and 2(c) are diagrams showing the MTF, FIG. 6 is a diagram showing image gradation patterns and FIG. 7 is a diagram showing a change of duty values.

DETAILED DESCRIPTION OF THE PREFERRED EMBODIMENT

A comparison of MTFs for generated images was made, in which a test pattern having both a line image portion and a solid image portion was used and latent images of the test pattern were developed with fresh developers on the assumption that all of the latent images have the same developability. FIG. 2 (A) shows a normal state wherein no measures for developability are taken, FIG. 2 (B) shows a state wherein a measure of lowering the power for laser beam is taken, and FIG. 2 (C) shows an occasion of the change of the emission time for a laser beam. For example, a laser beam is emitted fully in terms of time for one pixel in the case of (A) and (B), while the emission time of a laser beam for one pixel in (C) is shorter compared with (A) and (B). In the case of (B) wherein the laser power is lowered, the surface potential on the portion of exposure for the latent image on a photoreceptor is less lowered because the power for a laser beam for exposure of the line image portion on the test pattern is lowered. In this case, the toner adhesion amount on the exposure portion for each of (B) and (C) is smaller than that for (A). Next, with regard to output images produced through transferring of the developed latent images onto a recording sheet, a thickened line portion that is so-called a blurred character appears on the latent image of the line portion of the test pattern in (A), while the reduced maximum density on the output image of the test pattern appears in (B). However, an output image that is free from both thickened line portion and reduced maximum density can be obtained in the present method. As a result, the MTF is high in (C), medium in (B) and low in (A).

Figure 3:
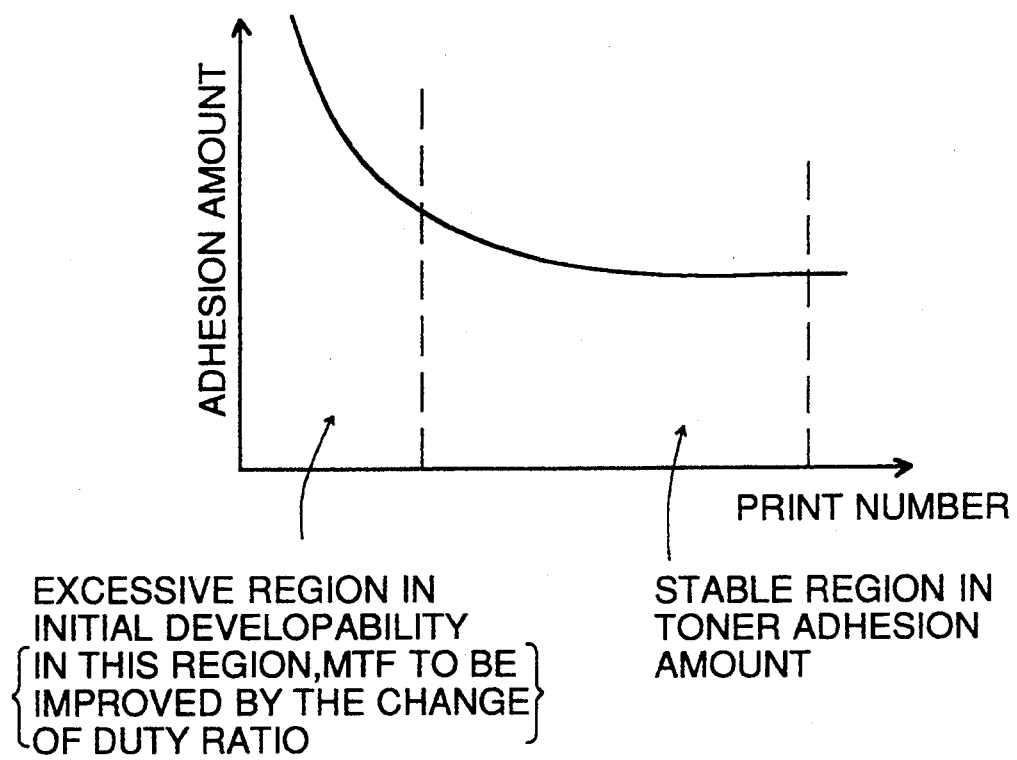
FIG. 3 is a diagram showing a change in toner adhesion amount.

FIG. 3 represents a pattern in a conventional method showing a change in an amount of toners adhering to a latent image corresponding to a solid image portion of the test pattern for fresh developers. For a period from the start of printing to the moment when a certain number of prints are made, an initial excessive developability region appears, and after that, a period of stable amount of adhering toners follows. In this initial excessive developability region, an MTF is improved by lowering the duty rate of laser beam emission, and in the stabilized region thereafter, the amount of adhering toners is decreased slightly and stabilized, so the duty rate is increased accordingly. With regard to the feedback of the change in duty rate, (a) it is determined by the number of prints made, or
(b) the feedback is made while confirming the density change in a halftone portion among several kinds of patches formed on a photoreceptor.

Example (a)

Figure 4:
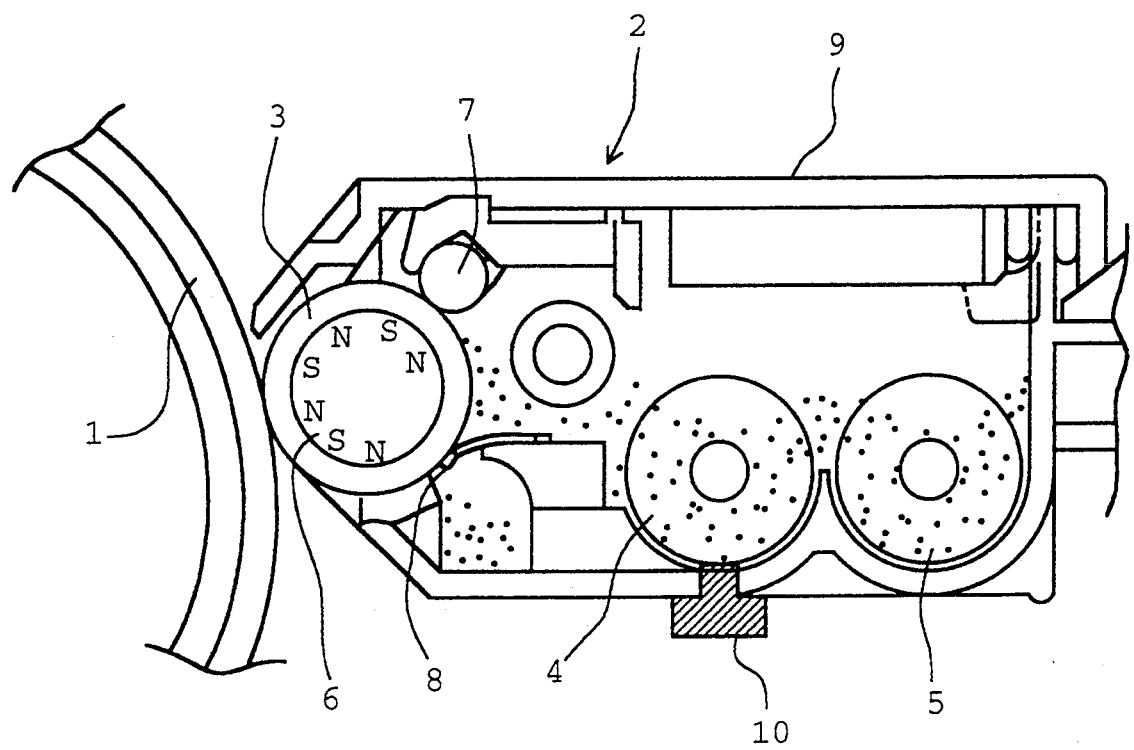
FIG. 4 is a cross-sectional view of a developing unit.

FIG. 4 is a cross-sectional view of a developing unit that is facing photoreceptor 1. The developing unit 2 is provided therein with developing sleeve 3, stirring screws 4 and 5, magnet roller 6, thin layer forming member 7 and scraper 8. The clearance between the developing sleeve 3 and the photoreceptor 1 is constantly kept to a fixed distance of $D_{sd}=0.5$ mm by means of an unillustrated stopper roll provided on a coaxial basis with the developing sleeve 3. Each of the stirring screws 4 and 5 is a stirring member that rotates oppositely to the other and stirs and mixes fully toners supplied by an unillustrated supplying means through supply port 9 and magnetic carriers. Namely, two-component developers consisting of toners and carriers, after being made to be a uniform developer electrified frictionally by being stirred and mixed fully by the stirring screws 4 and 5, are supplied to the developing sleeve 3, In this case, two-component developers having toner particle size of $d_{50}=15$ μm, carrier particle size of $D_{50}=50$ μm and toner concentration $T_C=7\%$ were used.

The developing sleeve 3 is provided therein with fixed magnet roller 6 and is provided around thereof with thin layer forming member 7 and scraper 8. The magnet roller 6 is usually composed of fixed isodynamic magnets of 8-16 poles placed at equal intervals with S poles and N poles arranged alternatively. In the diagram, however, the magnet roller is of a constitution of arranged magnets of 8 poles for simplification and clearness, a repulsive magnetic field is formed at the position where the magnet roller touches the scraper 8 and one pole is eliminated for forming 7 poles for the purpose of easy separation of developers. Though the arrangement of 7 poles magnets is shown in the diagram, the constitution of 9 poles magnets arrangement was employed in the present example.

Developers supplied by the stirring screws 4 and 5 adhere to the peripheral surface of the developing sleeve 3 and are formed to a thin layer by the thin layer forming member 7. These developers are conveyed together with the surface of the developing sleeve 3 ($\phi=20$ mm) rotating at the rate of rotation $S_R=350$ r.p.m. and develop latent images on the circumferential surface of the photoreceptor 1 having the linear speed $V_P=140$ mm/sec in the developing region to form toner images through non-contact reversal development while keeping the aforementioned clearance for development. In this case, a reversal development method wherein the black zone potential of $V_L=-50$ V is satisfied under the conditions of white zone potential $V_H=-850$ V and duty of 100% is used. In the case of the non-contact development, developing bias wherein A.C. component having bias voltage of $V_{P-P}=1.8$ KV and frequency of $F=8$ KHZ is superimposed on D.C. component having bias voltage of $V_{DC}=-750$ V from an unillustrated power supply, is impressed on the aforementioned developing sleeve 3. As a result, toners in developers located at the developing region on the developing sleeve 3 adhere to the surface of the latent image.

With regard to the following occasions (a), (b) and (c) all of which employ an image forming apparatus equipped with the above-mentioned functions, a comparison among MTFs based on the number of prints made for each MTF will be shown as follows. In the method for evaluating the MTF, an image of a resolution test pattern consisting of pairs of lines each being 60 μm in width is formed, and then the MTF is measured. In this particular case, the laser emission time per one pixel is changed. Namely, the laser emission time for one full pixel in the conventional method is represented by duty rate 100%, and duty rate 75% or duty rate 50% used in the display of the present method means that the relative emission time for one pixel is 75% or 50%. The way of changing is based on judgment by means of a CPU wherein a map of relationship between the number of prints made and the duty is inputted in advance. The invention, however, is not limited only to this method, but the change in a shape of a reference wave used for emitting a laser beam or the change in offset voltage can also be employed.

(a) Duty rate 50% at the start, duty rate 75% at the moment when 500 prints have been made, and duty rate 100% at the moment when the following 500 prints have been made all in the present method.

(b) When no measures are taken in the conventional method, the duty rate 100% is kept constantly from the start.

(c) In the case of the above-mentioned occasion (1), though the duty rate 100% is kept constantly from the start, the laser power is reduced to a half that in each of the occasions (a) and (b).

Figure 5:
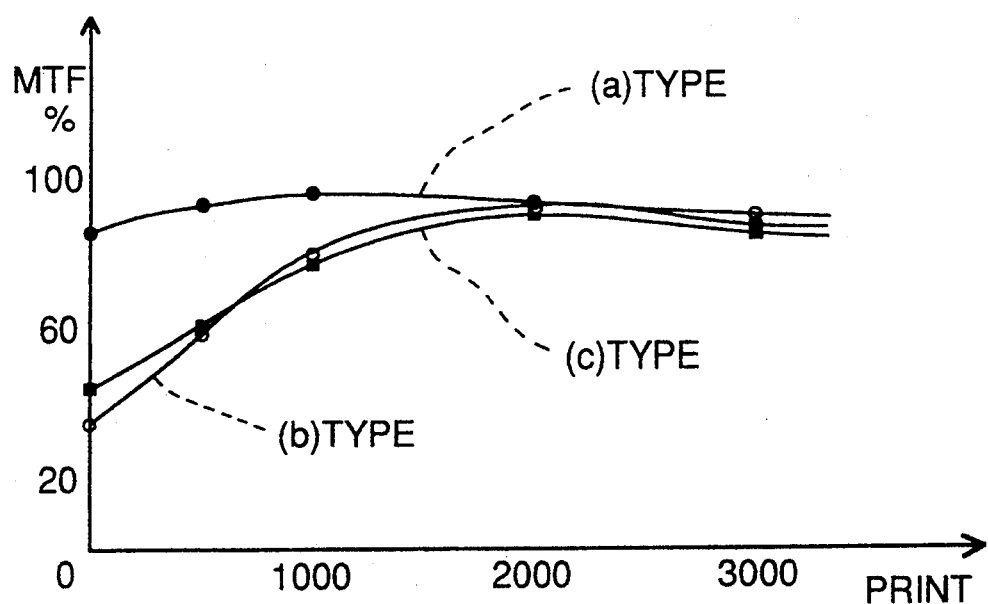
FIG. 5 is a diagram showing the results of measurements.

The results of measurement of MTFs are shown in FIG. 5. Compared with the conventional method (c), the present method offers better results, indicating that a method of the feedback of the change in duty rate depending on the number of prints made in the present method can be used for improving the MTF.

Example (b)

Figure 6:
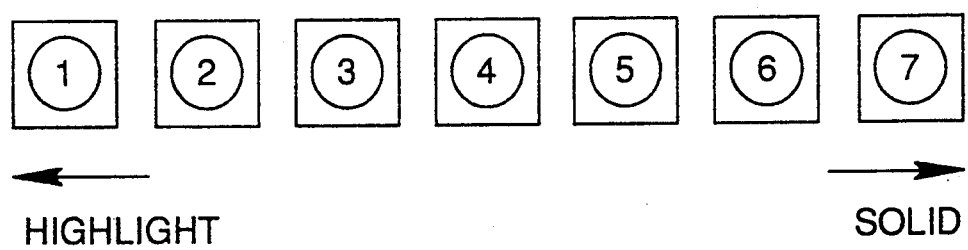

FIG. 6 represents a gradation pattern diagram for output images wherein the gradation is classified into 7 steps for simplification and clearness. The symbols ① and ② represent a highlight, ③, ④ and ⑤ represent a halftone and ⑥ and ⑦ represent a solid image portion. Density patches for the area ranging from the highlight to the solid image portion (①-⑦) are prepared. Patches prepared for the density for ③-⑤ among the aforementioned area are irradiated by LED light (for example, infrared-light-emitting diode), and reflected light therefrom is read optically by a photosensor, thus the reference values of amounts of optical reflection are inputted in a CPU in advance. With these amounts of reflected light as a reference, the inclination of amounts of reflected light for ③-⑤ and an amount of reflected light of ③ are held in table value 1. The feedback of the change in duty rate for an improvement of MTF is based on correlation with amounts of reflected light of patches ③-⑤ which changed corresponding to an increase of the number of prints made.

Under the assumption that;

$D_c(1)$=(density inclination obtained from changed amounts of reflected light of patches ③, ④ and ⑤)—(density inclination obtained from amount of reflected light of table value 1), and $D_c'(1)$=(density obtained from amount of reflected light of patch ③)—(density obtained from amount of reflected light of ③ of table value 1), when the value of $D_c(1)$ is positive, zero and negative, and when $D_c'(1)$ is positive, zero and negative, the value of duty rate is changed as shown in FIG. 7. Under that condition, patches for ①-⑦ are prepared again, and the same operation is repeated for adjustment of duty rates. With regard to this selection of the duty rate, a map in CPU is written again for change when an amount of reflected light that is a reference is inputted in the CPU. This map is constantly referred in the CPU for determining the value of a duty rate. As stated above, the feedback of the change in duty rate for an improvement of MTFs is subject to the combination of $D_c$ values and $D_c'$ values. Further, with regard to calculation of $D_c$ values and $D_c'$ values, it is preferable to calculate with $B_K$ signals in the case of monocolor, $B_K$, for example, and to calculate for each case of Y(yellow), M(magenta), C(cyan) and $B_K$(black) in the case of full-color.

Improvement in blurred characters and deterioration of MTF both of which are caused by thickened line width that is brought about by initial excessive developability occurring when fresh developers are used can be achieved without being accompanied by secondary demerit such as a fall of the maximum density. Further, an improvement of image quality that is stable not only in the initial stage but also in the later stage can be realized because feedbacks of the change in duty rate are conducted depending on density of visualized images.

What is claimed is:

1. An apparatus for forming a toner image using a developer containing toner, wherein fresh developer initially displays excessive developability properties; excessive developability being lowered to a stable developability after said developer has been subjected to a given amount of use, said apparatus comprising;
    an image carrier having an imaging surface electrified with an electric charge;
    a writing device for irradiating said imaging surface for each pixel with a laser beam having a maximum light intensity, to form a latent image;
    a developing device for developing said latent image on said imaging surface with said developer to form a toner image; and
    a control for detecting an amount of use to which said developer has been subjected, and for changing an irradiating time period of said laser beam for each pixel in accordance with said amount of use, without changing a maximum light intensity, whereby an irradiating time period used after said initial excessive developability of said developer is lowered to said stable developability is longer than that used with said fresh developer.

2. The apparatus of claim 1, wherein the control changes a duty ratio of the laser beam.

3. The apparatus of claim 1 further comprising means for transferring said toner image onto a copy sheet, wherein said control means detects the amount of use to which the developer has been subjected, based on a number of copied sheets.

4. The apparatus of claim 1 wherein said control means detects the amount of use to which the developer has been subjected, based on a density of formed toner images.

* * * * *